Figure 1:
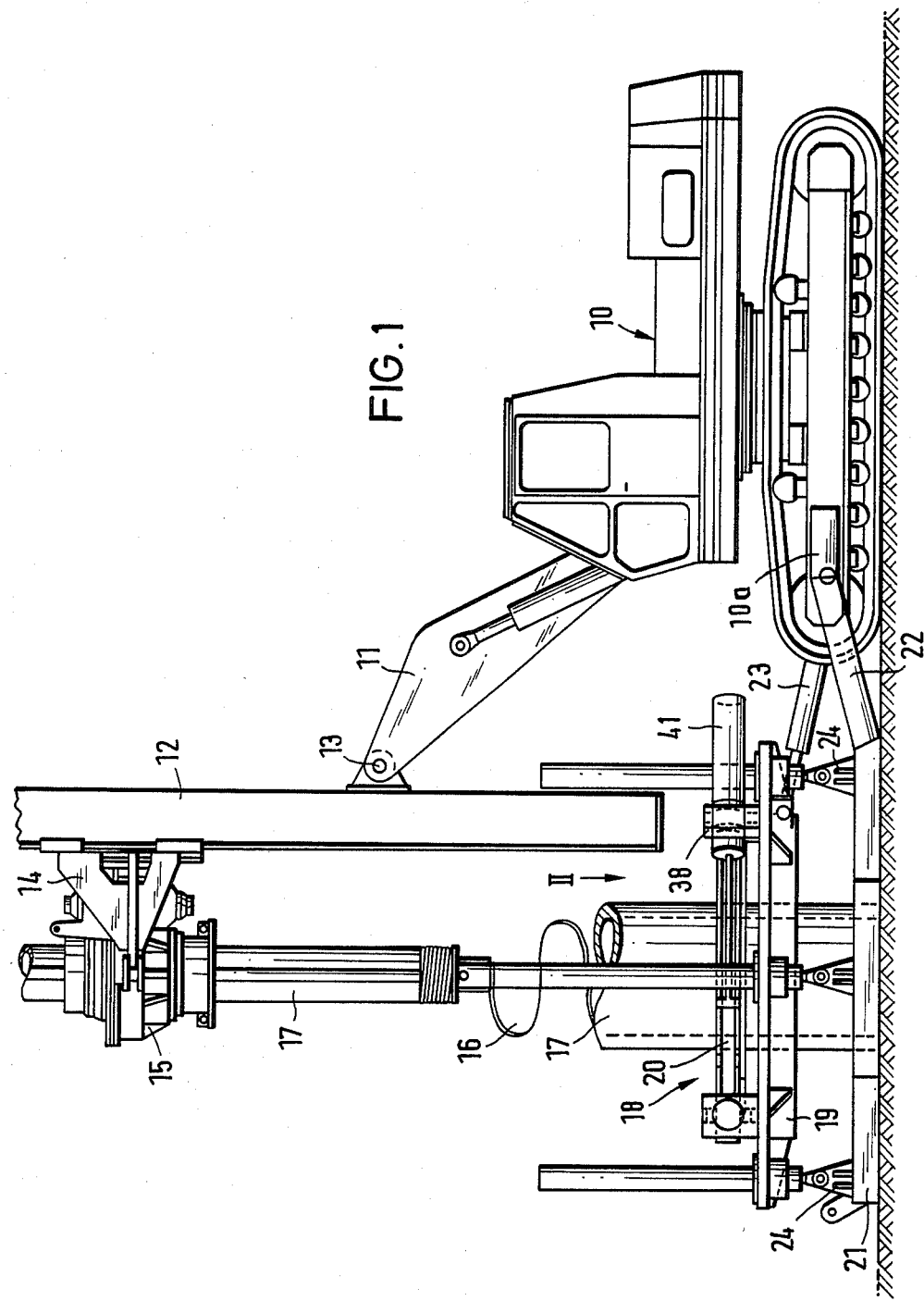

United States Patent [19]

Klemm

[11] Patent Number: 4,719,978
[45] Date of Patent: Jan. 19, 1988

[54] EARTH DRILLING DEVICE

[75] Inventor: Günter Klemm, Drolshagen, Fed. Rep. of Germany

[73] Assignee: Ing. Günter Klemm Spezialunternehmen für Bohrtechnik, Fed. Rep. of Germany

[21] Appl. No.: 936,752

[22] Filed: Dec. 2, 1986

[30] Foreign Application Priority Data

Dec. 13, 1985 [DE] Fed. Rep. of Germany ....... 3544086

[51] Int. Cl.$^4$ ............................ E21B 3/02; E21B 7/22
[52] U.S. Cl. ..................................... 175/113; 175/114; 175/170; 175/171; 74/128; 173/163
[58] Field of Search ............... 175/113, 121, 170, 195, 175/171, 114; 173/163 X; 81/60, 57.39; 74/128 X, 160

[56] References Cited

U.S. PATENT DOCUMENTS

| | | | |
|---|---|---|---|
| 3,515,009 | 6/1970 | Matusch et al. | 74/128 |
| 3,799,276 | 3/1974 | Matsushita et al. | 175/171 |
| 3,874,196 | 4/1975 | Hisey et al. | 173/163 |
| 4,496,272 | 1/1985 | Teske | 74/128 |
| 4,624,324 | 11/1986 | Mathieu et al. | 173/163 |

Primary Examiner—Stephen J. Novosad
Assistant Examiner—Bruce M. Kisliuk
Attorney, Agent, or Firm—Diller, Ramik & Wight

[57] ABSTRACT

To rotate a pipe (17) to be urged into the ground, a rotary disk (20) clamped at said pipe (17) is pivotable on a table (19) which carries two groups of driving cylinders (40, 41). While the first group is operative to carry out the working stroke in order to turn the rotary disk (20) the return stroke is performed by the second group thus ensuring a continuous rotation of the rotary disk (20) or a standstill in one sense of rotation.

10 Claims, 4 Drawing Figures

EARTH DRILLING DEVICE

The invention relates to an earth drilling device for rotating a pipe into the ground, comprising a rotary disk having a clamping means for engaging the pipe and being rotatable by at least one reciprocatingly driven first driving cylinder, and a table supporting the first driving cylinder and carrying the rotary disk, the table being supported nonrotatively.

As a rule, for rotating the drill pipe in case of earth and hard-rock drilling devices, use is made of a hydraulic motor which engages a gear ring mounted nonrotatively at the drill pipe for its continuous rotation. In case of larger borehole diameters such as required for pile foundations, the drill pipe may have a diameter of about 2 to 3 meters which would necessarily involve a rather big hydraulic motor model. The resultant hydraulic motor would be quite uneconomical and much too heavy in weight.

Therefore, for borehole diameters from about 750 mm concerning pile bores, use is made of rotary drives by which the pipe is rotated by one or more reciprocating driving cylinders and is thereby simultaneously urged into the ground. In other words, the pipe is driven by rotating downwardly into the ground. At the end of the pipe a cutting ring is provided. Since such rings usually cut in one sense of rotation only and the material is discharged from the annular gap in only one direction of rotation as well, no substantial advance of the drill pipe is effected during the return movement. Due to the reciprocating rotation, the soil in front of the cutting ring is solidified and, at best, squeezed away. While earth drilling means comprising a reciprocating rotary drive of the drill pipe lend themselves to apply high torques, they do not satisfy the needs concerning the drill advance.

It is the object of the invention to provide an earth drilling device of the above mentioned type which is capable of producing, in case of a continuous rotation, high torques and of achieving an important drill advance.

The problem is solved according to the invention in that the rotary disk comprises a plurality of peripherally distributed engaging members capable of being advanced by the first driving cylinder, that during its working stroke, the first driving cylinder presses against one of the respective engaging members and moves away therefrom during its return stroke and that a swivel means is provided which, prior to the working stroke, swivels the first driving cylinder towards the axis of the rotary disk to apply it to one of the engaging members.

The rotary drive of the earth drilling device of the invention is of a ratchet type in which the rotary disks are rotated sectionwise by the driving cylinder, which, in case of each return stroke, is released from the rotary disk so that the latter is always rotated in one direction only with the resultant advantage that, in operation, the pipe is always rotated in the same sense thus avoiding a solidification of the soil due to a reciprocating rotation. Further, unnecessary grinding of the cutting ring in the drill material is excluded. As compared to the known drilling devices operating with the use of a continuous rotary drive, the rotary drive of the invention may be of a substantially smaller and lighter design.

The earth drilling device of the invention is particularly suited for producing pile bores of a diameter from about 750 mm. The core which is left inside the drill pipe may be drilled out by means of a core drilling tool or a similar device such as a drilling screw, a continuous screw, a drill bucket or the like. The cutting ring at the end of the pipe may be a unilaterally cutting annular bore-crown having cutting elements which are cutting in one sense of rotation only. The cutting efficiency of such an annular bore-crown is substantially higher than that of bidirectionally cutting bore-crowns.

In a preferred embodiment of the invention, at least one second driving cylinder controlled substantially in counterphase to the first driving cylinder engages the rotary disk in such a way that the first and the second driving cylinder cause continuous rotation of the rotary disk. While the first driving cylinder performs a return stroke, the second carries out a working stroke. Thus, it is ensured that always one of the two driving cylinders or one of the two groups of driving cylinders acts rotatingly on the rotary disk to thus obtain its continuous rotation.

According to a preferred embodiment of the invention, the clamping means comprises a plurality of clamping jaws mounted around the pipe and being passed axially against an inclined surface of the rotary disk by a pressure member which is guided at the table. Further, by tension elements, the pressure member is moved to the rotary disk. The tension elements engage the nonrotative rotary disk as well as the nonrotative pressure member thus inhibiting their rotation in common with the pipe. As a favorable result thereof, it is possible to use hydraulic tension elements whose hoses do not coil up during the rotation of the pipe. Suitably, the clamping jaws are supported with respect to the pressure member by axial bearings thus allowing a frictionless rotation of the clamping jaws relative to the non-rotating thrust bearing.

Although, in operation, the earth drilling device of the invention only rotates in one direction, it may be convenient to optionally change its sense of rotation. To this effect, according to another embodiment of the invention, the rotary disk comprises first engaging members capable of being pushed by the driving cylinders in one sense of rotation, and second engaging members capable of being pulled by the driving cylinders in the other sense of rotation. Both groups of engaging members are formed, for instance, by recesses in the rotary disk which open in different directions.

In case of a rotary disk comprising one type of engaging members only, the swivel means pressing the driving cylinder ends against the periphery of the rotary disk may consist of flexible springs. In such a case, the peripheral regions of the rotary disk intermediate the engaging members are effective as cam paths on which slide the ends of the driving cylinders which do not perform their working strokes. If two kinds of engaging members are provided, it is to be ensured that the driving cylinders cooperate with one kind of engaging members only. To this effect, each swivel means consists of a drive which is controlled in responsive to the travel position of the piston of the appertaining driving cylinder.

Said drive may for instance be a hydraulic cylinder. Only if the associated driving cylinder is at the start of its working stroke, the corresponding swivel means is activated to enable the driving cylinder to engage the rotary disk. In case of the subsequent working stroke of the driving cylinder, the swivel means may be rendered powerless so that it may idly follow the swivel movements of the driving cylinders caused by the rotary disk.

Figure 2:
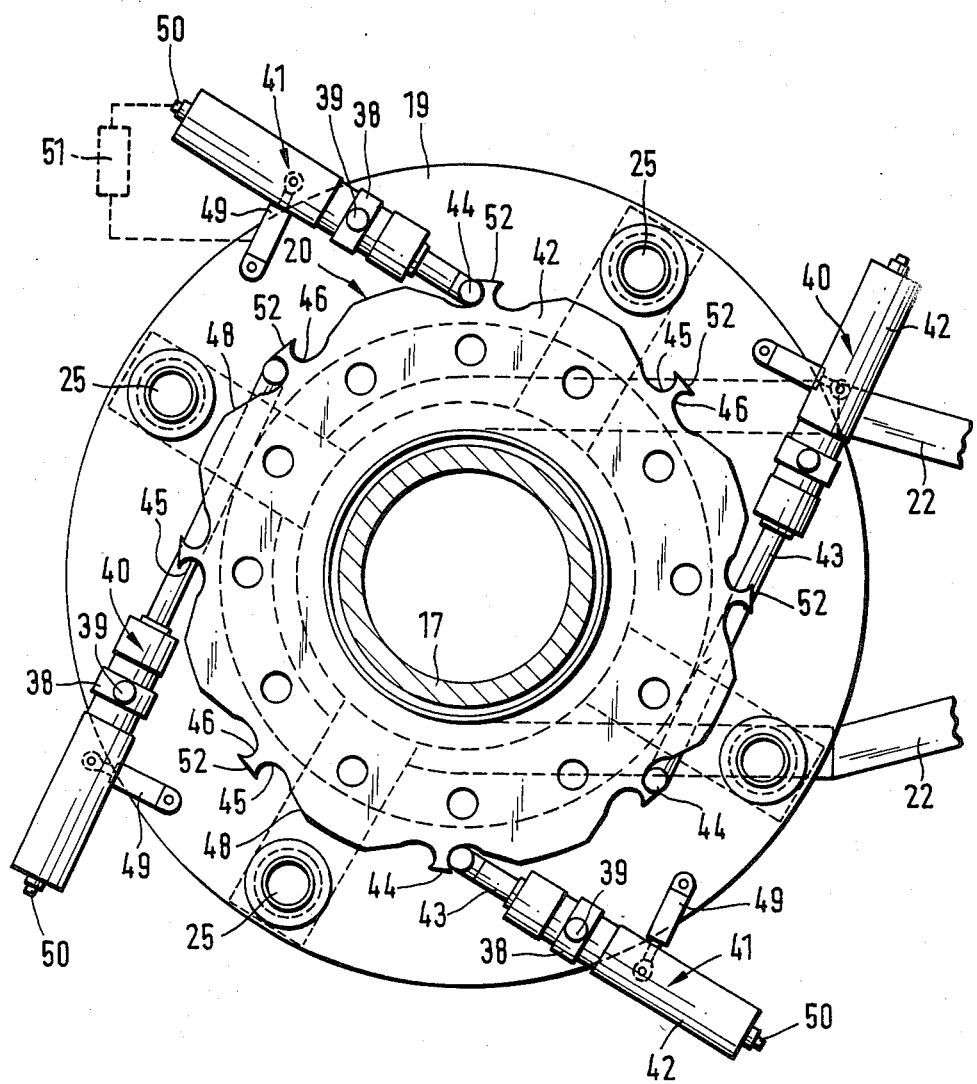
Figure 3:
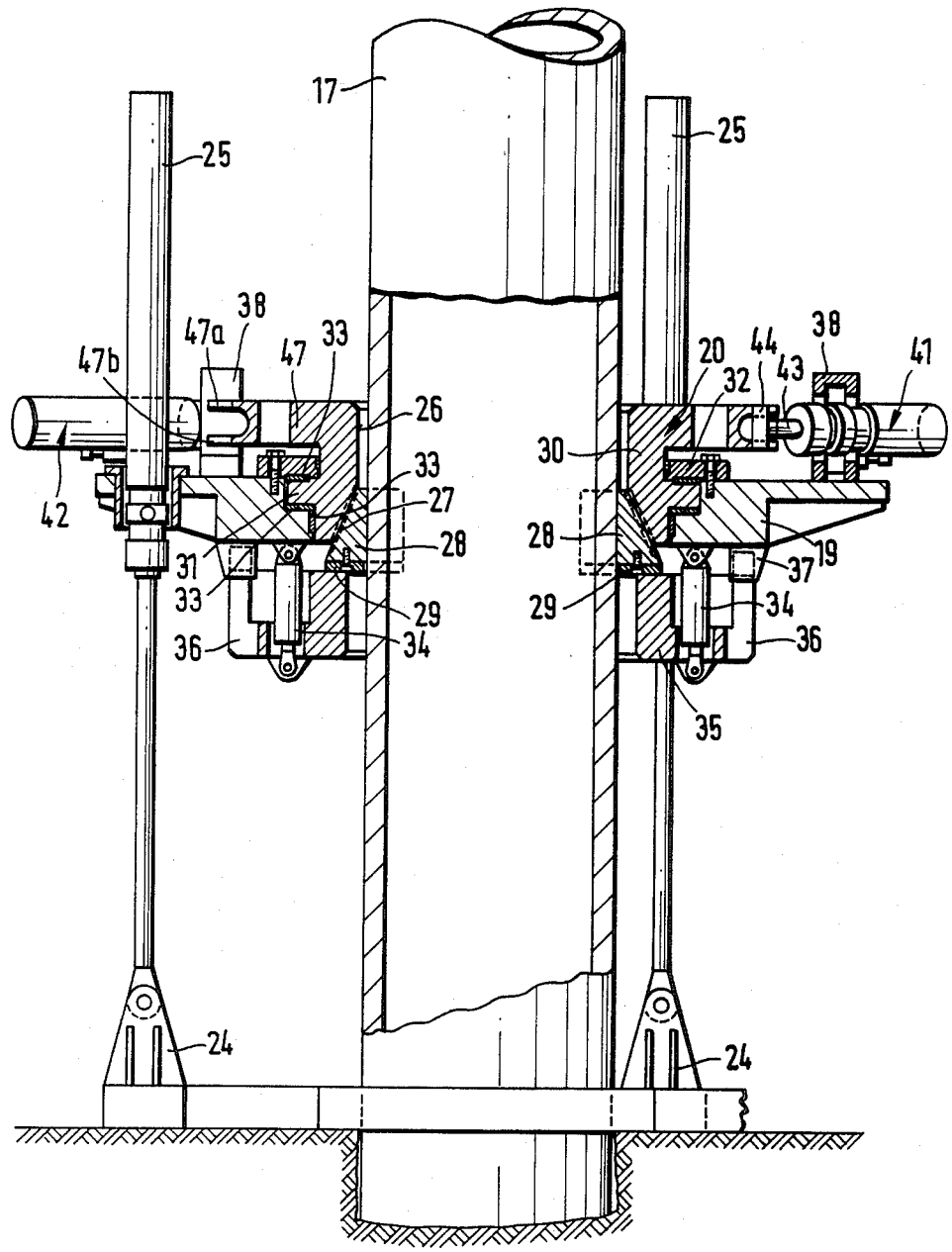
Figure 4:
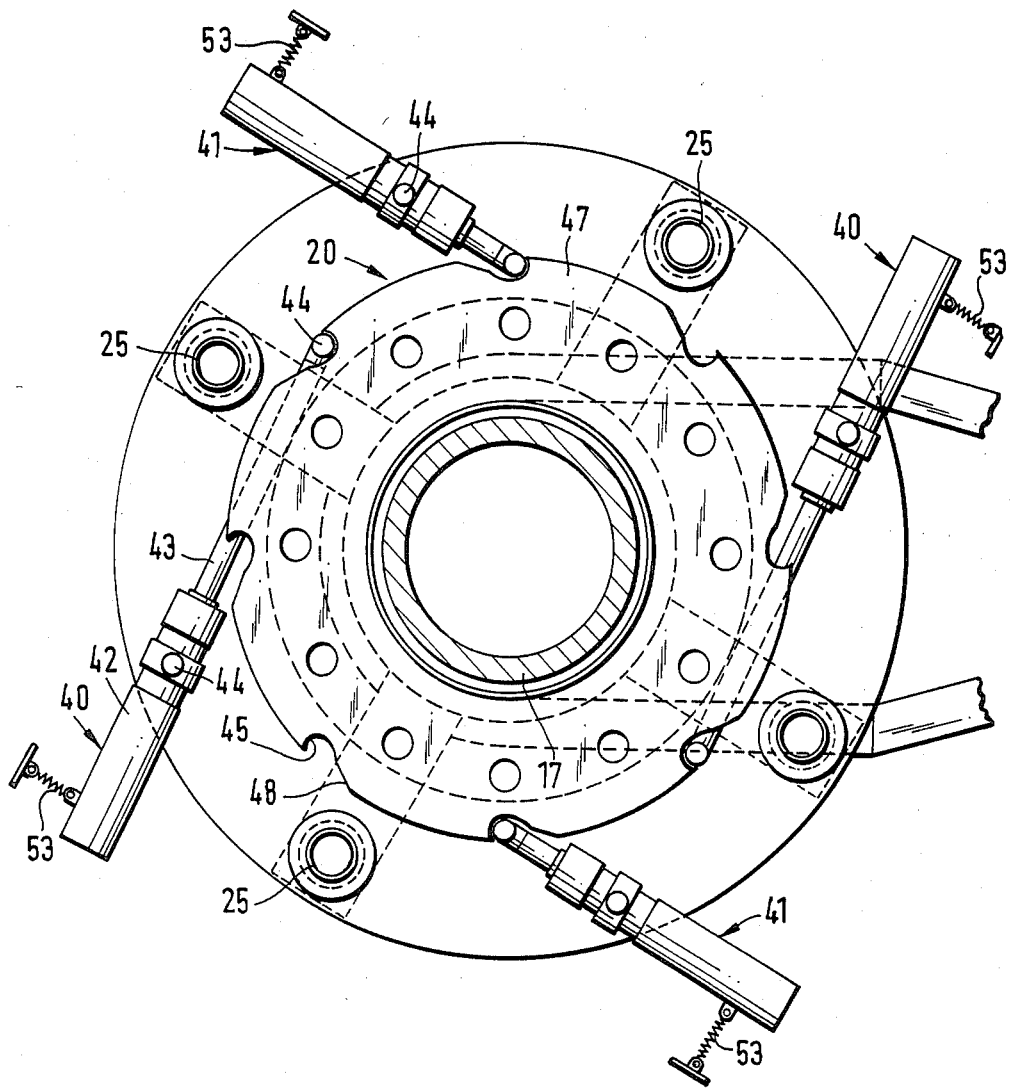

Some embodiments of the invention will be explained hereunder in more detail with reference to the drawings in which FIG. 1 is a side view of the earth drilling device, FIG. 2 is a plan view of the rotary drive in the direction of arrow II of FIG. 1, FIG. 3 is a vertical section of the rotary drive and FIG. 4 is a view similar to that of FIG. 2 of another embodiment of the rotary disk.

The earth drilling device shown in FIG. 1 comprises a full-track vehicle 10 carrying a guiding amount 12 at its hydraulically orientable arm 11, said guiding mount 12 being adapted to swing about a horizontal axle 13. A carriage 14 movable along mount 12 supports a power revolving head 15 for a drilling tool 16. Said power revolving head 15 is driving a Kelly rod being longitudinally displaceable in the power revolving head and having secured to its end drilling tool 16 for drilling out the interior of pipe 17 which, for its part, is turned into the ground.

The rotary drive 18 for rotating pipe 17 comprises a table 19 surrounding annularly the pipe and at which the rotary disk 20 also encompassing annularly pipe 17 is pivotally supported.

The rotary drive means 18 is fixed to the annular basic frame 21 which is disposed in the vicinity of the borehole and through the central opening of which projects pipe 20. Said basic frame 21 is rigid, but, if necessary, adjustably connected to an abutment 10a which, in the instant case, consists of the frame of the moving gear of the full-track vehicle 10. Intermediate the abutment 10a and the basic frame 21, there extend rigid arms 22. Further, the abutment 10a is connected to table 19 via two supports 23 in the form of hydraulic cylinders which engage the table 19 at different peripheral points thus resisting table rotation by locking said supports 23.

On top of the basic frame 21, at least two bearing blocks 24 are distributed peripherally to carry respective rams 25 in the form of hydraulic cylinders whose housings are supported pivotally in table 19 about horizontal axes and whose piston rods engage the hinges of the bearing blocks 24. By actuating the hydraulic cylinders, table 19 may be lifted or lowered, the rams 25 providing the advance or feeding force for pipe 17 and being also suited to extract the pipe out of the borehole.

The rotary disk 20 contains a passage aperture 26 having a diameter larger than the external diameter of pipe 17 thus avoiding a direct jamming between rotary disk 20 and pipe 17. Recess 26 is adjacent to an inclined face 27 of an internal cone type adjoined by clamping jaws 28 being guided nonrotatingly at the inclined face 27 by means of intermeshing grooves and stems. Their external face is adapted to the inclined face 27, and their internal face rests flatly against pipe 17. The clamping jaws 28 form wedges which, by axial displacement, may be pressed radially against pipe 17. To the underside of each clamping jaw 28, an axial bearing 29 is fixed which consists of a sleeve bearing plate.

A tubular section 30 of the rotary disk 20 comprises a flange 31 projecting radially to the outside and extending into a corresponding recess of table 19, said recess being covered upwardly by a plate 32 screwed to table 19. Due to flange 31 seated in the recess, rotary disk 20 is protected against axial displacements relative to the table 19. To enable the rotary disk 20 to rotate frictionless in table 19, there are provided bearings 33 which exclude a direct frictional contact between the rotary disk 20 and table 19.

Tension elements 34 of the hydraulic cylinder type are mounted beneath table 19. Their other ends engage the annular tension element 35 which consists of a block whose upper side presses against the underside of the clamping jaws 28 or of the slide plates 29. Upon actuation of the tension elements 34, the pressure member 35 is moved towards table 19, whereby the clamping jaws 28 are sliding along the inclined face 27 while pipe 17 is being wedged at the rotary table 30. To prevent the pressure member 25 from rotating in common with the pipe, said pressure member is provided with upright arms 36 which extend between vertical guide elements 37 at the underside of table 19 to hold the pressure member 35 nonrotatively relative to table 19.

On top of table 19, a plurality of projecting swivel bearings 38 are adapted to support each cylinder housing of a driving cylinder with horizontal axis so that said driving cylinder may be swivelled about a vertical axis 39, the swivel bearings 28 of the two first driving cylinders 40 being offset by 180° on table 19 and the swivel bearings 38 of the second driving cylinders 41 are disposed therebetween. Driving cylinders 40 and 41 are disposed alternatingly in peripheral direction and at equal angular distances which, in case of four driving cylinders, are 90°.

Each driving cylinder 40, 41 consists of a hydraulic piston cylinder unit having a piston rod 43 removable out of the cylinder housing 42. The end of the piston rod 43 is provided with a T-shaped ram 44 which may engage sections 45 or 46 at the periphery of flange 47 of rotary disk 20, which flange extends axially beyond the top of table 19. The periphery of flange 47 consists of two superposed coincident fork prongs 47a, 47b (FIG. 3) engaged by the two arms of the T-shaped ram 44 while the piston rod 43 extends between said fork prongs 47a, 47b.

Each driving cylinder 40, 41 is disposed nearly tangentially relative to the rotary disk 20, and all of the feed pistons with their piston rods point to the same peripheral direction. The engaging members 45 and 46 are formed by troughs arranged in the circumference of the rotary disk 27 and are adapted to be engaged by rams 44 thus allowing, during the working stroke of a feed piston, to rotate the rotary disk 20 relative to table 19.

The engaging members 45 are so designed that the rams 44 are pressed into them when the piston rod 43 is removed, and the rotary disk 20 will be turned clockwise accordingly. The second engagement sections 46 are oriented in opposite direction so that the transverse bars of the rams 44 may penetrate into them if the piston rods 43 are withdrawn into the cylinder housing 42 thus allowing the counterclockwise rotation of the rotary disk 20. Two respective engagement sections 45 and 46 are provided in mutually closed relationship and are only separated from one another by a small stem 52 forming, in a way, a tooth having two undercut flanks of which each is suited to cooperate with a ram 44.

Two oppositely located first driving cylinders 40 are operated synchronously and in phase, and the second driving cylinders 41 arranged at right angles thereto are operated in counterphase to the first driving cylinders 40.

FIG. 2 shows the situation in which, in case of a clockwise rotation of the rotary disk 20, the first cylinders 40 are just terminating the working stroke while the working stroke of the second driving cylinders 41 is just initiated. In other words, the piston rods 43 of the first working cylinders 40 are moved out, while the piston rods of the second driving cylinders are still withdrawn. Said operations slightly overlap in time so that the rotary disk 20 is driven continuously. In the transition phase, both groups of driving cylinders simultaneously rotate the rotary disk 20 for a short period of time thus avoiding its standstill. Subsequently, the piston rods 43 of the first driving cylinders 40 are retracted, whereby the rams 44 on the rear flank 48 of the recess forming the engaging section 45 are pressed radially to the outside thus being disengaged from the rotary disk. Said swivel movement is performed each time during the return stroke of the corresponding driving cylinder.

To apply, in case of the one sense of rotation (clockwise), ram 44 of the driving cylinder to the first engaging members 45 and, at the same time, to prevent said rams from cooperating with the second engaging members 46 which are responsible for the rotation in counter-direction, there are provided swivel means 49 which consist each of a hydraulic cylinder supported at the table 19 and engaging the associated driving cylinder in order to swivel it about the vertical axis 39. Said swivel movement is performed in that the ram 44 of the corresponding driving cylinder 40 or 41 is swivelled to the periphery of the rotary disk 20 if the piston has reached its end position. To this effect, each driving cylinder is provided with a position indicator 50 which at least may detect each of the two end positions of the piston. Such position indicators or distance sensors 50 have been known and need not be explained in detail. The distance sensor 50 controls a switch valve 51 for the actuation of the appertaining swivel means 49. If ram 44 engages engaging section 45, the swivel means 49 is switched to be powerless so that the driving cylinder may freely adjust itself to the movement of the peripheral face of the rotary disk 20.

In the instant embodiment, piston rods 43 are of such a length that, with each working stroke of a feed piston 40, 41, the rotary disk 20 rotates by 45°. Therefore, the first engaging members 45 are spaced mutually at angles of 45°. By this means, in case of a clockwise rotation, the rotary disk 20 is advanced by the driving cylinders.

If the rotary disk 20 is to be rotated anticlockwise, the valves 51 are reversed when the rams 44 are above the second engaging members 46. At that moment, the feed pistons entrain the rotary disk 20 with their retracting movement so that the rotary disk 20 will be drawn by them.

Due to the fact that two first driving cylinders 40 and two second driving cylinders 41 engage the rotary disk 20 at opposite points, no tilting moment may act on the rotary disk 20.

The alternating operation of first and second driving cylinders may be performed in a time-independent manner, however, a distance-dependent control is preferred by using the signals of distance sensors 50 in order to achieve reversal only if one group of driving cylinders has reached its final position. Thus, it is ensured that the rotation will be continuous and that, with each piston stroke of a driving cylinder, the corresponding ram may find the associated engaging section.

In rotating the rotary table 20 as disclosed above, pipe 17 is entrained and also rotated via the pressure member 35 and the clamping jaws 17.

FIG. 4 shows an embodiment corresponding substantially to the first one so that only the differences need be explained hereunder.

The rotary drive shown in FIG. 4 is used to rotate the rotary disk 20 in one direction only. Hence, the configuration of the peripheral face of the rotary disk is simplified and only includes the trough-shaped first engaging members 45 with the adjacent rearward flanks 48. The swivel means 53 consist of springs anchored in table 19 in order to swivel the associated driving cylinder 40 or 41 about the vertical axis 44 so that ram 44 is kept on pressing against the peripheral face of the rotary disk 47.

What is claimed is:

1. An earth drilling device for rotating a pipe (17) into the ground comprising a rotary disk (20) having clamping means (28, 35) for engaging the pipe, a reciprocatingly driven first driving cylinder (40) for rotating said clamping means (28, 35), a stationary table (19) supporting said rotary disk (20), said rotary disk (20) having a plurality of peripherally distributed engaging members (45) capable of being advanced by said first driving cylinder (40), means for selectively operating said first driving cylinder (40) to advance said engaging members (45) in a first direction of rotation during a working stroke and moving away from said engaging members during a return stroke, swivel means (49, 53) for swiveling the first driving cylinder (40) toward the axis of the rotary disk (20) to effect selective engagement thereof with said engaging members (45), said rotary disk (20) having an inclined face (27), said clamping means (28, 35) including a plurality of clamping jaws (28) which are pressed axially against said inclined face (27) by a pressure member (35), and tension means (34) for urging said clamping means (28) and rotary disk (20) into clamping engagement through said inclined face (27).

2. The earth drilling device as defined in claim 1 wherein said clamping jaws (28) are supported by axial bearings (29) against the pressure member (35).

3. The earth drilling device as defined in claim 2 including a second driving cylinder (41) supported by said table (19), and means for selectively operating said second driving cylinder (41) to advance said engaging members (45) substantially in counterphase rotation with said first driving cylinder (41) during rotation in at least said first direction of rotation whereby said first and second driving cylinders (40, 41, respectively) ensure continuous rotation of said rotary disk (20).

4. The earth drilling device as defined in claim 1 including an abutment (10) backing-up said stationary table (19) through at least two supports (23), a frame (21) fixed to said abutment (10), and ram means (25) between said table and frame for effecting relative movement therebetween in a direction generally parallel to the axis of said rotary disk (20).

5. The earth drilling device as defined in claim 4 including a second driving cylinder (41) supported by said table (19), and means for selectively operating said second driving cylinder (41) to advance said engaging members (45) substantially in counterphase rotation with said first driving cylinder (41) during rotation in at least said first direction of rotation whereby said first and second driving cylinders (40, 41, respectively) ensure continuous rotation of said rotary disk (20).

6. The earth drilling device as defined in claim 1 including a second driving cylinder (41) supported by said table (19), and means for selectively operating said second driving cylinder (41) to advance said engaging members (45) substantially in counterphase rotation with said first driving cylinder (41) during rotation in at least said first direction of rotation whereby said first and second driving cylinders (40, 41, respectively) ensure continuous rotation of said rotary disk (20).

7. An earth drilling device for rotating a pipe (17) into the ground comprising a rotary disk (20) having clamping means (28, 35) for engaging the pipe, a reciprocatingly driven first driving cylinder (40) for rotating said clamping means (28, 35, a stationary table (19) for supporting said rotary disk (20), said rotary disk (20) having a plurality of peripherally distributed engaging members (45) capable of being advanced by said first driving cylinder (40), means for selectively operating said first driving cylinder (40) to advance said engaging members (45) in a first direction of rotation during a working stroke and moving away from said engaging members during a return stroke, swivel means (49, 53) for swiveling the first driving cylinder (40) toward the axis of the rotary disk (20) to effect selective engagement thereof with said engaging members (45), and said rotary disk (20) includes other engaging members (46) operated by said first driving cylinder (40) to advance said other engaging members (46) in a second direction of rotation opposite to said first direction of rotation.

8. The earth drilling device as defined in claim 7 including means (49) for controlling the operation of said first driving cylinder (40) to engage only said first-mentioned or other engaging members (45, 46, respectively).

9. The earth drilling device as defined in claim 8 including a second driving cylinder (41) supported by said table (19), and means for selectively operating said second driving cylinder (41) to advance said engaging members (45) substantially in counterphase rotation with said first driving cylinder (41) during rotation in at least said first direction of rotation whereby said first and second driving cylinders (40, 41, respectively) ensure continuous rotation of said rotary disk (20).

10. The earth drilling device as defined in claim 7 including a second driving cylinder (41) supported by said table (19), and means for selectively operating said second driving cylinder (41) to advance said engaging members (45) substantially in counterphase rotation with said first driving cylinder (41) during rotation in at least said first direction of rotation whereby said first and second driving cylinders (40, 41, respectively) ensure continuous rotation of said rotary disk (20).

* * * * *